United States Patent
Lemmer et al.

(10) Patent No.: US 7,198,851 B2
(45) Date of Patent: *Apr. 3, 2007

(54) COATED ARTICLE WITH LOW-E COATING INCLUDING IR REFLECTING LAYER(S) AND CORRESPONDING METHOD

(75) Inventors: Jean-Marc Lemmer, Lorentzweiler (LU); Jose Ferreira, Rumelange (LU); Jens-Peter Müller, Differdange (DE); Scott V. Thomsen, South Lyon, MI (US)

(73) Assignees: Centre Luxembourgeois de Recherches pour le Verre et la Ceramique S.A. (C.R.V.C.), Grand Duche de Luxembourg (LU); Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/008,644

(22) Filed: Dec. 10, 2004

(65) Prior Publication Data

US 2006/0046018 A1    Mar. 2, 2006

Related U.S. Application Data

(63) Continuation-in-part of application No. 10/999,153, filed on Nov. 30, 2004, and a continuation-in-part of application No. 10/931,212, filed on Sep. 1, 2004.

(51) Int. Cl.
*B32B 17/06* (2006.01)

(52) U.S. Cl. ............. 428/432; 428/697; 428/698; 428/699; 428/701; 428/702

(58) Field of Classification Search ............. 428/428, 428/432, 433, 434, 697, 698, 699, 701, 702, 428/704
See application file for complete search history.

(56) References Cited

U.S. PATENT DOCUMENTS

| | | |
|---|---|---|
| 5,425,861 A | 6/1995 | Hartig et al. |
| 5,514,476 A | 5/1996 | Hartig et al. |
| 5,552,180 A | 9/1996 | Finley et al. |
| 5,557,462 A | 9/1996 | Hartig et al. |
| 5,595,825 A | 1/1997 | Guiselin |

(Continued)

OTHER PUBLICATIONS

U.S. Appl. No. 10/999,153, filed Nov. 30, 2004.

(Continued)

*Primary Examiner*—Jennifer McNeil
*Assistant Examiner*—G. Blackwell
(74) *Attorney, Agent, or Firm*—Nixon & Vanderhye P.C.

(57) ABSTRACT

A coated article is provided with a low-emissivity (low-E) layer stack for use in a window unit or the like. The layer stack, or coating, may permit the coated article to achieve one or more of a low solar factor (SF) value, a high selectivity ($T_{vis}$/SF) value, substantially neutral color at normal and/or off-axis viewing angles, and/or low emissivity. When high selectivity values are achieved, there is provided a high ratio of visible transmission to SF, which is a desirable feature in certain example instances. In certain example embodiments, a sub-oxide layer may be used as a contact layer under an infrared (IR) reflecting layer in order to permit low SF values, high selectivity, and good coloration to be achieved.

20 Claims, 2 Drawing Sheets

U.S. PATENT DOCUMENTS

| | | | |
|---|---|---|---|
| 5,770,321 | A | 6/1998 | Hartig et al. |
| 5,800,933 | A | 9/1998 | Hartig et al. |
| 5,837,108 | A | 11/1998 | Lingle et al. |
| 5,837,361 | A | 11/1998 | Glaser et al. |
| 5,948,538 | A | 9/1999 | Brochot et al. |
| 5,993,950 | A * | 11/1999 | Novis et al. ............... 428/216 |
| 6,014,872 | A | 1/2000 | Hartig et al. |
| 6,132,881 | A | 10/2000 | Hartig et al. |
| 6,673,427 | B2 | 1/2004 | Guiselin et al. |
| 6,686,050 | B2 | 2/2004 | Lingle et al. |
| 6,692,831 | B2 | 2/2004 | Stachowiak |
| 2002/0031674 | A1 | 3/2002 | Laird |
| 2003/0150711 | A1 | 8/2003 | Laird |
| 2004/0005467 | A1 * | 1/2004 | Neuman et al. ............ 428/432 |

OTHER PUBLICATIONS

U.S. Appl. No. 10/931,212, filed Sep. 1, 2004.
U.S. Appl. No. 10/800,012, filed Mar. 15, 2004.
U.S. Appl. No. 10/787,823, filed Feb. 27, 2004.
U.S. Appl. No. 10/914,635, filed Aug. 10, 2004.
U.S. Appl. No. 10/797,561, filed Mar. 11, 2004.

* cited by examiner

COATED ARTICLE WITH LOW-E COATING INCLUDING IR REFLECTING LAYER(S) AND CORRESPONDING METHOD

This application is a continuation-in-part (CIP) of each of U.S. patent application Ser. No. 10/931,212, filed Sep. 1, 2004, and Ser. No. 10/999,153, filed Nov. 30, 2004, the disclosures of which are hereby incorporated herein by reference.

This invention relates to a coated article including a low-E coating, and/or methods of making the same. Coated articles according to certain example embodiments of this invention may be used in the context of insulating glass (IG) window units, other types of windows, or in any other suitable application.

BACKGROUND OF THE INVENTION

Coated articles are known in the art for use in window application such as insulating glass (IG) window units, vehicle windows, and/or the like. In certain situations, designers of coated articles often strive for a combination of high visible transmission, substantially neutral color, low emissivity (or emittance), and blockage of undesirable radiation such as infrared (IR) radiation to prevent undesirable heating of a building interior or the like. High visible transmission for example may permit coated articles to be more desirable in certain window applications, whereas low-emissivity (low-E), low SHGC (solar heat gain coefficient), and low SF (solar factor, or g-value) characteristics permit coated articles to block significant amounts of undesirable radiation so as to reduce, for example, undesirable heating of vehicle or building interiors.

Solar factor (SF, or g-value), calculated in accordance with DIN standard 67507, relates to a ratio between the total energy entering a room or the like through a glazing and the incident solar energy. Thus, it will be appreciated that low SF values are indicative of good solar protection against undesirable heating of rooms or the like protected by windows/glazings. For example, a low SF value is indicative of a coated article (e.g., IG unit such as a double glazing) that is capable of keeping a room fairly cool in summertime months during hot ambient conditions.

While low SF values are typically desirable for coated articles such as IG window units, the achievement of low SF values typically comes at the expense of visible transmission and/or coloration. It is often desirable, but very difficult, to achieve a combination of a high visible transmission and a low SF value for a coated article such as an IG window unit or the like. In this regard, the ratio between visible transmission ($T_{vis}$) and SF is sometimes referred to as "selectivity." In other words, the "selectivity" of a coated article is defined by $T_{vis}/SF$.

High selectivity ($T_{vis}/SF$) values are indicative of a combination of high visible transmission and low SF, and are thus often desirable. Unfortunately, high selectivity ($T_{vis}/SF$) values have heretofore been difficult to achieve.

For example, an object of glazings described in U.S. Pat. No. 6,673,427 to Guiselin is to achieve the "highest possible" selectivity (i.e., $T_{vis}/SF$). In this regard, see the '427 patent at column 1, lines 54–60. Given this goal of achieving the highest possible selectivity (i.e., $T_{vis}/SF$), glazings according to the '427 patent were only able to achieve a selectivity of about 1.6 to 1.7 in a double glazing (see the '427 patent at column 7, lines 3–5). In particular, Example 3 of the '427 patent achieved a selectivity of about 1.67 whereas Example 4 of the '427 patent achieved a selectivity of about 1.61 as evidenced by Table 2 of the '427 patent (e.g., for Example 4,61/38=1.605).

While higher selectivities are sometimes achievable, they have come at the expense of higher SF values and/or undesirable coloration at normal and/or off-normal viewing angles such as 45 degrees. For example, Examples 1 and 2 of U.S. Pat. No. 5,595,825 to Guiselin used triple-silver coatings to allegedly achieve selectivity values in double glazings of 1.97 and 1.82, respectively. However, the coatings of the '825 patent required the use of three separate silver layers at particular thicknesses to achieve such selectivity values, at the expense of higher SF values of 30 and 34 respectively. Such high SF values may sometimes be undesirable in certain example instances since they are indicative of coatings that in certain situations cannot block sufficient radiation from reaching a building or vehicle interior. Too, in certain example instances, the requirement of three separate silver layers may be undesirable in that such coatings are more costly and burdensome to manufacture and may be more susceptible to yield problems. Furthermore, it is unclear from the '825 patent whether the coatings thereof realize significant color shifts upon change in viewing angle and/or undesirable coloration.

U.S. 2003/0150711 to Laird, the disclosure of which is hereby incorporated herein by reference, discloses a coating having the following layers oriented from the glass substrate outwardly:

| Glass Substrate | Thickness (Å) |
|---|---|
| $TiO_2$ | 200 |
| ZnO | 90 |
| Ag | 130 |
| $NiCrO_x$ | 30 |
| $SnO_2$ | 680 |
| ZnO | 90 |
| Ag | 168 |
| $NiCrO_x$ | 30 |
| $SnO_2$ | 125 |
| $Si_3N_4$ | 220 |

While the aforesaid coated article of U.S. 2003/0150711 achieves excellent results in many respects, when used in the context of an IG window unit (or double glazing), examples thereof achieve a selectivity ($T_{vis}/SF$) of about 1.7 or so. Higher selectivity values and/or lower SF values are often desirable.

In view of the above, it will be apparent to those skilled in the art that there exists a need for coated articles which are capable of providing one or more of high selectivity values, low SF values, substantially neutral color at normal and/or off-axis viewing angles, and/or low emissivity (or emittance).

BRIEF SUMMARY OF EXAMPLE EMBODIMENTS OF THE INVENTION

In certain example embodiments of this invention, a coated article is provided with a layer stack which may permit the coated article to achieve one or more of high selectivity values, low solar factor (SF) values, substantially neutral color at normal and/or off-axis viewing angles, and/or low emissivity. When high selectivity ($T_{vis}/SF$) values are achieved, there is provided a high ratio of visible transmission to solar factor (SF), which will be appreciated by those skilled in the art. Coated articles according to certain example embodiments of this invention may be, or may be used in, IG window units, monolithic windows, or other types of windows.

In certain example embodiments of this invention, a coated article is provided which has both high selectivity and desirable coloration at both normal and off-axis viewing angles such as 45 degrees from normal. Moreover, in certain example embodiments, the coloration of the coated article does not shift by more than a predetermined amount between a normal viewing angle and an off-axis viewing angle of 45 degrees for example.

In certain example embodiments of this invention, a coated article such as an IG window unit realizes a selectivity value ($T_{vis}$/SF) of at least about 1.70, more preferably of at least about 1.75, even more preferably of at least about 1.80, and sometimes at least about 1.82.

In certain example embodiments of this invention, high selectivity is achieved without sacrificing SF values. In other words, high selectivity values are achieved in combination with rather low SF values. Thus, in certain example embodiments of this invention, coated articles realize a high selectivity value, in combination with a SF of no greater than 27.5, more preferably a SF of no greater than about 27.0, more preferably a SF of no greater than about 26.5, even more preferably a SF of no greater than about 25.0, even more preferably a SF of no greater than about 24.0, even more preferably a SF of no greater than about 23.0, and even more preferably a SF of no greater than about 22.0. This permits coated articles, for example, to realize good selectivity while at the same time blocking significant undesirable radiation from reaching a building interior or the like.

In certain example embodiments of this invention, coated articles realize a visible transmission of from about 30 to 50%, more preferably from about 35 to 45%, and most preferably from about 38 to 42% in a monolithic and/or IG unit context.

In certain example embodiments of this invention, the low-E coating of a coated article includes only two IR reflecting layers (e.g., only two silver or silver-based layers). While other numbers of IR reflecting layers may sometimes be provided, the use of two is preferable in certain instances in that more such layers are not required thereby making coatings easier and cost effective to manufacture and less susceptible to yield problems.

In certain example embodiments of this invention, a coated article is provided with an infrared (IR) reflecting layer(s) of or including a material such as silver (Ag), gold, or the like. The IR reflecting layer is located between respective lower and upper contact layers, each of which contacts the IR reflecting layer. The contact layers may be made of material(s) such as an oxide of nickel-chrome (NiCrO$_x$) in certain example embodiments of this invention. In certain embodiments, the lower contact layer is of the sub-oxide type, whereas the upper contact layer is more oxided than is the lower contact layer. Surprisingly and unexpectedly, it has been found that by using a sub-oxide contact layer under and contacting the IR reflecting layer and a more oxided contact layer over the IR reflecting layer, significantly higher selectivity values and lower SF values may be achieved in combination with desirable coloration at normal and/or off-axis viewing angles. These represent significant example advantages in the art.

In certain example embodiments of this invention, there is provided an insulating glass (IG) window unit comprising first and second glass substrates, and a coating supported by one of the substrates, the coating comprising at least one layer comprising silver sandwiched between and contacting first and second contact layers, wherein the first contact layer is located below said layer comprising silver and is oxided to a lesser extent than is the second contact layer located above said layer comprising silver; and wherein the IG window unit has a visible transmission of from 30 to 50%, a selectivity ($T_{vis}$/SF) of at least 1.70, and a solar factor (SF) of no greater than 25.0.

In other example embodiments of this invention, there is provided an insulating glass (IG) window unit comprising first and second glass substrates, and a coating supported by one of the substrates, the coating comprising first and second infrared (IR) reflecting layers, each of the IR reflecting layers being sandwiched between and contacting a pair of contact layers, wherein the IG window unit has a selectivity ($T_{vis}$/SF) of at least 1.70, and a solar factor (SF) of no greater than 25.0.

In still further example embodiments of this invention, there is provided a coated article including a coating supported by a glass substrate, the coating comprising at least one IR reflecting layer sandwiched between and contacting first and second contact layers, wherein the first contact layer is located below said layer comprising silver and is oxided to a lesser extent than is the second contact layer located above said layer comprising silver; and wherein the coated article has a selectivity ($T_{vis}$/SF) of at least 1.70.

In further example embodiments of this invention, there is provided a method of making a coated article, the method comprising a) providing a glass substrate; b) forming a first contact layer comprising an oxide of at least one metal on the glass substrate; c) forming a layer comprising silver on and in contact with the first contact layer; d) forming a second contact layer comprising an oxide of at least one metal on and in contact with the layer comprising silver; and e) wherein steps b) and d) are performed so that the first contact layer is deposited in a manner so as to be less oxided than the second contact layer as deposited and so that the resulting coated article has a selectivity of at least 1.70 and a SF of no greater than 24.

DETAILED DESCRIPTION OF EXAMPLES OF THE INVENTION

Figure 1:
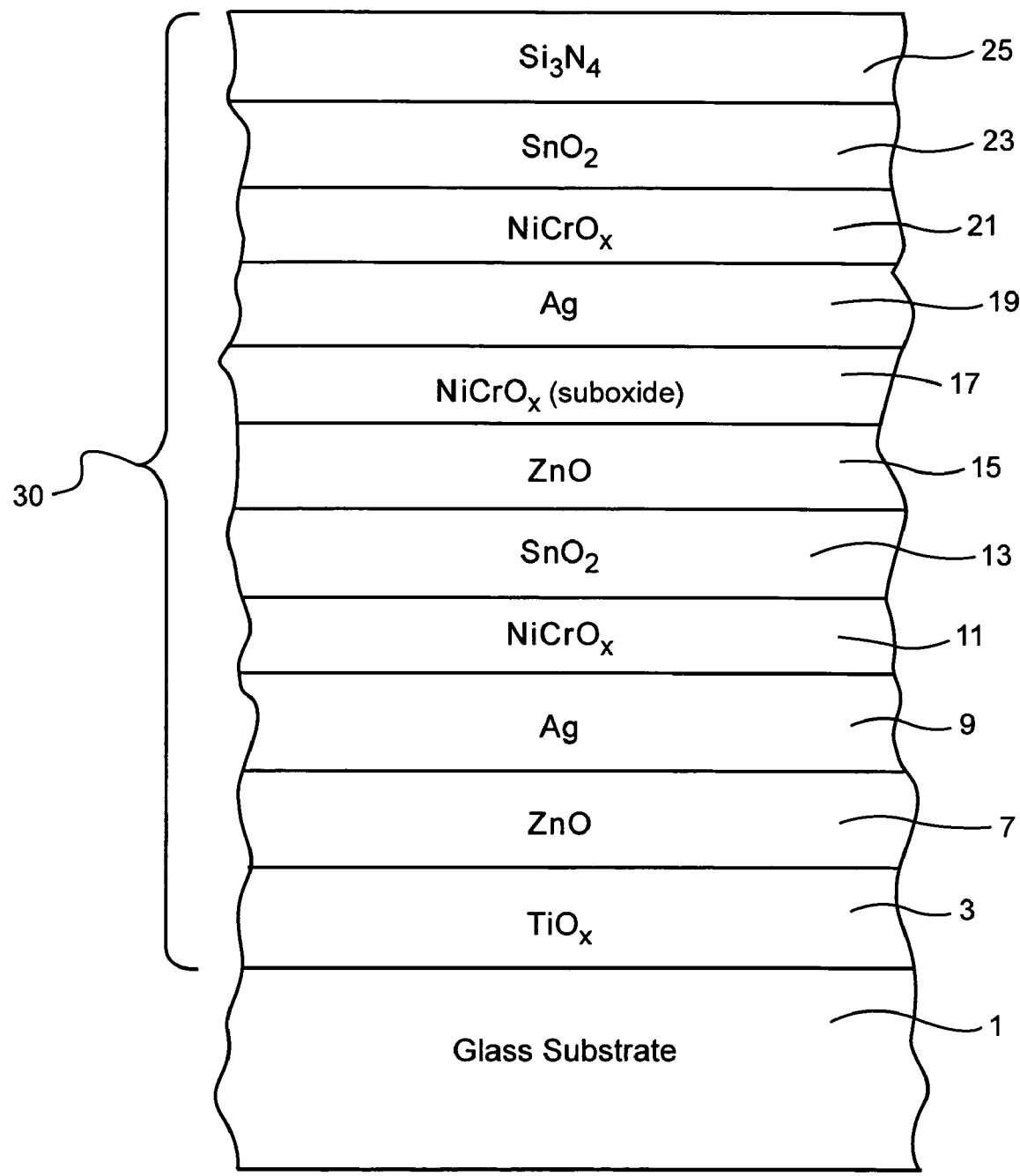
FIG. 1 is a cross sectional view of a coated article according to an example embodiment of this invention.

Referring now more particularly to the accompanying drawings in which like reference numerals indicate like parts throughout the several views.

Coated articles herein may be used in applications such as IG window units (which may include two or more glass substrates with a space therebetween), monolithic windows, and/or any other suitable application that includes single or multiple glass substrates for a window or the like. In certain example embodiments of this invention, the coating includes a double-silver stack (i.e., two layers each of which comprises or is composed of silver), although this invention is not so limited in all instances.

In certain example embodiments of this invention, a coated article is provided with a layer stack which may permit the coated article to achieve one or more of high selectivity ($T_{vis}$/SF), a low solar factor (SF), substantially neutral color at normal and/or off-axis viewing angles, and/or low emissivity. One, two, three, or all of these features may be achieved in different embodiments of this invention. When high selectivity ($T_{vis}$/SF) is achieved, there is provided a high ratio of visible transmission ($T_{vis}$) to solar factor (SF), which will be appreciated by those skilled in the art as being an indication of a combination of good visible transmission and good solar protection of a building and/or vehicle interior for example.

In certain example embodiments of this invention, a coated article such as an IG window unit (e.g., with two spaced apart glass substrates) realizes a high selectivity ($T_{vis}$/SF) of at least about 1.70, more preferably of at least about 1.75, even more preferably of at least about 1.80, and sometimes at least about 1.82. In certain example embodiments of this invention, high selectivity is achieved without sacrificing SF. In other words, high selectivity values are achieved in combination with rather low SF values. Thus, in certain example embodiments of this invention, coated articles realize a high selectivity value, in combination with a SF of no greater than 27.5, more preferably a SF of no greater than about 27.0, more preferably a SF of no greater than about 26.5, even more preferably a SF of no greater than 25.0, even more preferably a SF of no greater than 24.0, even more preferably a SF of no greater than 23.0, and even more preferably a SF of no greater than 22.0. (SF, or g-value, is calculated in accordance with DIN 67507, the disclosure of which is hereby incorporated herein by reference). This permits coated articles, for example, to realize good selectivity while at the same time blocking significant undesirable radiation from reaching a building interior or the like.

In certain example embodiments of this invention, a coated article is provided which has both high selectivity and desirable coloration at both normal and off-axis viewing angles such as 45 degrees from normal. Moreover, in certain example embodiments, the coloration of the coated article does not shift by more than a predetermined amount between a normal viewing angle and an off-axis viewing angle of 45 degrees for example.

In certain example embodiments of this invention, coated articles realize a visible transmission of from about 30 to 50%, more preferably from about 35 to 45%, and most preferably from about 38 to 42% in a monolithic and/or IG unit context.

Sheet resistance ($R_s$) is indicative of emissivity or emittance. Low sheet resistance is achieved in certain example embodiments of this invention. In certain example embodiments of this invention, a coated articles realizes a sheet resistance ($R_s$) of no greater than about 3.0 ohms/square, more preferably no greater than about 2.0 ohms/square, and most preferably no greater than about 1.9 ohms/square before any optional heat treatment such as tempering. Such low sheet resistance values are indicative of low emissivity.

In certain example embodiments of this invention, the low-E coating of a coated article includes only two IR reflecting layers (e.g., only two silver or silver-based layers). While other numbers of IR reflecting layers may sometimes be provided, the use of two is preferable in certain instances in that low-emittance can be achieved and more such layers are not required thereby making coatings easier and cost effective to manufacture and less susceptible to yield problems.

In certain example embodiments of this invention, an IR reflecting layer is located between respective lower and upper contact layers, each of which contacts the IR reflecting layer. The contact layers may be made of material(s) such as an oxide of nickel-chrome (NiCrO$_x$) in certain example embodiments of this invention. In certain embodiments, the lower contact layer is of the sub-oxide type, whereas the upper contact layer is more oxided than is the lower contact layer. Surprisingly and unexpectedly, it has been found that by using a sub-oxide contact layer under and contacting the IR reflecting layer and a more oxided contact layer over the IR reflecting layer, significantly higher selectivity values and lower SF values may be achieved in combination with desirable coloration at normal and/or off-axis viewing angles. These represent significant example advantages in the art.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 7.0 mm thick), and coating (or layer system) 30 provided on the substrate 1 either directly or indirectly. The coating (or layer system) 30 includes: dielectric titanium oxide layer 3 which may be TiO$_x$ (e.g., where x is from 1.5 to 2.0), first lower contact layer 7 (which contacts IR reflecting layer 9), first conductive and preferably metallic infrared (IR) reflecting layer 9, first upper contact layer 11 (which contacts layer 9), dielectric layer 13 (which may be deposited in one or multiple steps in different embodiments of this invention), dielectric layer 15 which supports contact layer 17 and may be of or include zinc oxide, second lower contact layer 17 (which contacts IR reflecting layer 19), second conductive and preferably metallic IR reflecting layer 19, second upper contact layer 21 (which contacts layer 19), dielectric layer 23, and finally protective dielectric layer 25. The "contact" layers 7, 11, 17 and 21 each contact at least one IR reflecting layer (e.g., layer based on Ag, Au or the like). The aforesaid layers 3–25 make up low-E coating 30 which is provided on glass or plastic substrate 1.

Figure 2:
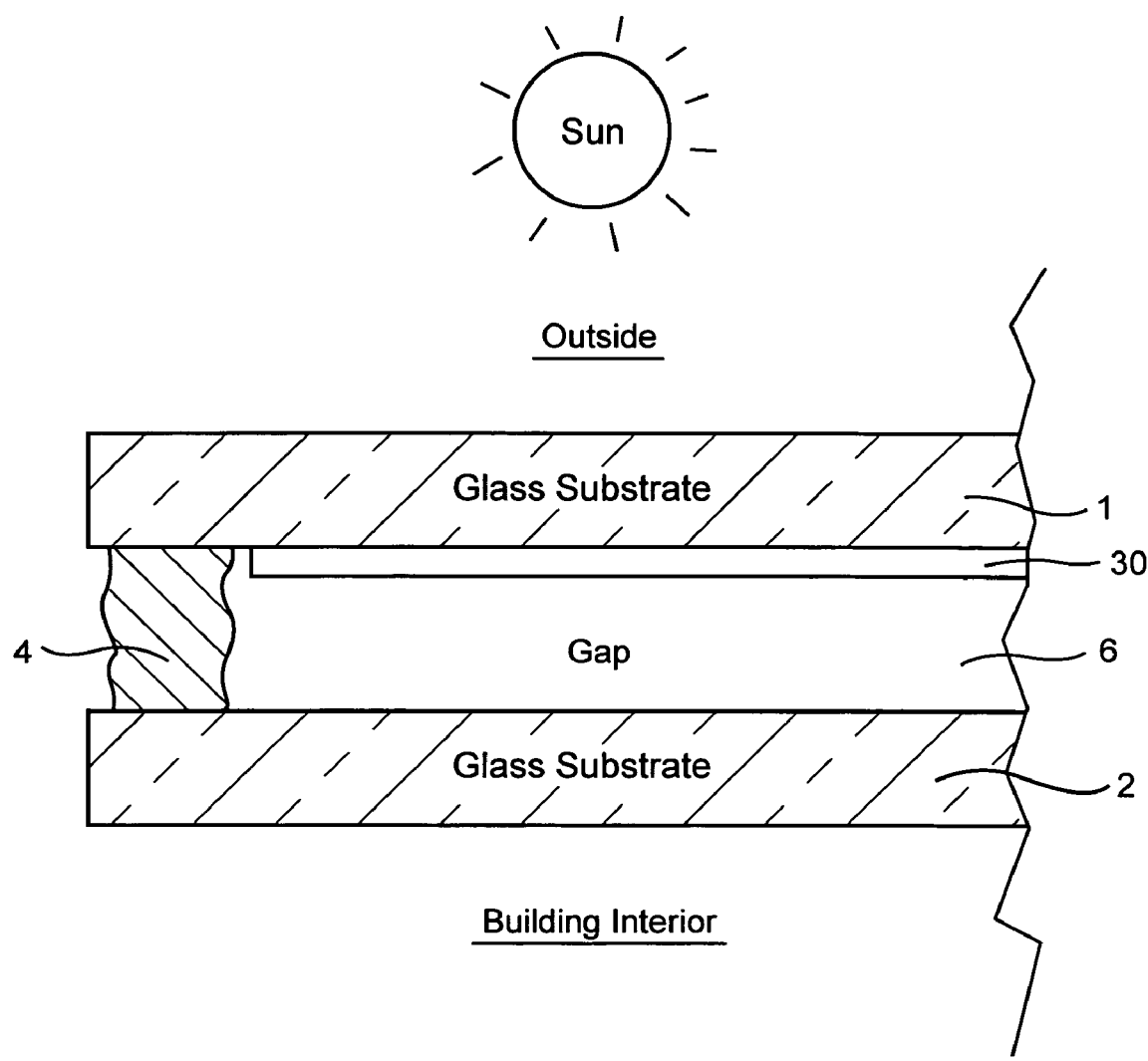
FIG. 2 is a cross section view of an IG unit according to an example embodiment of this invention.

In monolithic instances, the coated article includes only one glass substrate 1 as illustrated in FIG. 1. However, monolithic coated articles herein may be used in devices such as IG window units, or the like. As for IG window units, an IG window unit may include two or more spaced apart glass or plastic substrates. An example IG window unit is illustrated and described, for example, in U.S. Pat. No. 6,632,491, the disclosure of which is hereby incorporated herein by reference. An example IG window unit is also shown in FIG. 2 and may include, for example, the coated glass substrate 1 shown in FIG. 1 coupled to another glass substrate 2 via spacer(s), sealant(s) or the like 4 with a gap 6 being defined therebetween. This gap 6 between the substrates in IG unit embodiments may in certain instances be filled with a gas such as argon (Ar). The gap 6 may or may not be at a pressure less than atmospheric in different embodiments of this invention.

Still referring to FIG. 2, an example IG unit may comprise a pair of spaced apart glass substrates (1 and 2) each about 6 mm thick one of which is coated with a coating 30 herein in certain example instances, where the gap 6 between the substrates may be from about 5 to 30 mm, more preferably from about 10 to 20 mm, and most preferably about 16 mm. In certain example embodiments, the coating 30 is provided on the interior surface of the outer glass substrate 1 as shown in FIG. 2 (i.e., on surface #2 from the outside), although it may be provided on the other substrate 2 in alternative embodiments of this invention.

Dielectric layer 3 may be of or include titanium oxide in certain example embodiments of this invention. This layer is provided for anti-reflective purposes, and preferably has an index of refraction (n) of from about 2.0 to 2.6, more preferably from about 2.2 to 2.5. Layer 3 may be provided in direct contact with the glass substrate 1 in certain example embodiments of this invention, or alternatively other layer(s) may be provided between the substrate 1 and layer 3 in certain instances.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers 9 and/or 19 may, however, be slightly oxidized in certain embodiments of this invention.

Contact layers 11, 17 and 21 may be of or include nickel (Ni) oxide, chromium/chrome (Cr) oxide, or a nickel alloy oxide such as nickel chrome oxide (NiCrO$_x$), or other suitable material(s), in certain example embodiments of this invention. The use of, for example, NiCrO$_x$ in these layers (11, 17 and/or 21) allows durability to be improved. These contact layers may or may not be continuous in different embodiments of this invention across the entire IR reflecting layer.

In certain example embodiments of this invention, the upper contact layers 11 and/or 21 that are located above the respective IR reflecting layers 9 and 19 are deposited in a manner so as to be oxided to a first extent. In certain example embodiments, the upper contact layers 11 and/or 21 may be substantially fully oxided.

Surprisingly, it has been found that by using a sub-oxide contact layer 17 under and contacting the IR reflecting layer 19 and a more oxided contact layer 21 over the IR reflecting layer 19, significantly higher selectivity values and lower SF values can be achieved in combination with desirable coloration at normal and/or off-axis viewing angles. These represent significant example advantages in the art. In particular, it has been found that such unexpected results can be achieved when the contact layer 17 under the IR reflecting layer 19 is deposited in a manner so as to be oxided to a lesser extent than upper contact layer 21 on the other side of the IR reflecting layer 19. In certain example embodiments, contact layers 17 and 21 may be composed of oxides of the same metal(s), yet be oxided to different extents where the lower contact layer 17 is oxided to a lesser extent than is the upper contact layer 21. For example, in certain example embodiments of this invention, lower NiCrO$_x$ contact layer 17 is a sub-oxide (i.e., only partially oxided) whereas upper NiCrO$_x$ contact layer 21 is substantially fully oxided as deposited by sputtering or the like.

In certain example embodiments of this invention, as deposited and/or in the final product which is not thermally tempered in certain embodiments, sub-oxide contact layer 17 may have no more than about 80% of the oxygen content of the upper contact layer 21, more preferably no more than about 70% of the oxygen content of the upper contact layer 21, and most preferably no more than about 60% of the oxygen content of the upper contact layer 21. In each of these cases, as well as others, it will be appreciated that the lower contact layer 17 under the IR reflecting layer 19 is oxided to a lesser extent than is the upper contact layer 21 located over the IR reflecting layer 19 in at least certain portions of the respective contact layers.

In order to deposit sub-oxide contact layer 17 in a manner so as to be less oxided than upper contact layer 21, even when they are oxides of the same metal(s) such as Ni and/or Cr, less oxygen gas flow per kW of sputtering power may be used in sputtering layer 17 compared to layer 21. For example, given similar or the same type of sputtering target(s) (e.g., using NiCr based targets for each layer), an oxygen gas flow of from about 2 to 8 ml/kW (more preferably from about 3 to 7, and most preferably from about 4 to 7 ml/kW) may be used when sputtering sub-oxide lower contact layer 17, whereas an oxygen gas flow of from about 7 to 17 ml/kW (more preferably from about 8 to 16 ml/kW) may be used when sputtering substantially fully oxided upper contact layer 21 (the remainder of the gas flows may be made up of Ar or the like). In this particular example, the oxygen gas flow per kW of sputtering power for sub-oxide layer 17 is about 20 to 70% (more preferably about 50%) of that for the more oxided upper contact layer 21. In certain example embodiments of this invention, the oxygen gas flow per kW of sputtering power for sub-oxide layer 17 is no more than about 80% of that used for the upper more oxided contact layer 21, more preferably no more than about 70% of that used for the upper more oxided contact layer 21, and even more preferably no more than about 60% of that used for the upper more oxided contact layer 21.

In certain example embodiments of this invention, the upper contact layers 11 and 21 provided over the respective IR reflecting layers may be deposited in similar or the same manners.

Lower contact layer 7 and/or dielectric layer 15 in certain embodiments of this invention are of or include zinc oxide (e.g., ZnO). The zinc oxide of layer(s) 7, 15 may contain other materials as well such as Al (e.g., to form ZnAlO$_x$). For example, in certain example embodiments of this invention, one or more of zinc oxide layers 7, 15 may be doped with from about 1 to 10% Al, more preferably from about 1 to 5% Al, and most preferably about 2 to 4% Al. The use of zinc oxide 7 under the silver 9 allows for an excellent quality of silver to be achieved.

Dielectric layer 13 may be of or include tin oxide in certain example embodiments of this invention. However, as with other layers herein, other materials may be used in different instances. Dielectric layer 23 may be of or include tin oxide in certain example embodiments of this invention. However, layer 23 is optional and need not be provided in certain example embodiments of this invention. Dielectric layer 25, which may be an overcoat including one or more layers in certain example instances, may be of or include silicon nitride (e.g., Si$_3$N$_4$) or any other suitable material in certain example embodiments of this invention. Optionally, other layers may be provided above layer 25. For example, an overcoat layer of or including zirconium oxide (not shown) may be formed directly on top of the silicon nitride layer 25 in certain example embodiments of this invention. Silicon nitride layer 25 may be doped with Al or the like in certain example embodiments of this invention.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. Thus, the use of the word "on" herein is not limited to being in direct contact with.

While various thicknesses and materials may be used in layers in different embodiments of this invention, example thicknesses and materials for the respective layers on the glass substrate 1 in the FIG. 1 embodiment are as follows, from the glass substrate outwardly (the silver thicknesses are approximations based on deposition data):

Example Materials/Thicknesses; FIG. 1 Embodiment

| Layer | Preferred Range (Å) | More Preferred (Å) | Example (Å) |
|---|---|---|---|
| Glass (1–10 mm thick) | | | |
| TiO$_x$ (layer 3) | 10–450 Å | 50–250 Å | 105 Å |
| ZnO$_x$ (layer 7) | 10–300 Å | 40–150 Å | 65 Å |
| Ag (layer 9) | 50–250 Å | 60–120 Å | 96 Å |
| NiCrO$_x$ (layer 11) | 10–100 Å | 30–45 Å | 38 Å |
| SnO$_2$ (layer 13) | 0–1,000 Å | 350–850 Å | 641 Å |
| ZnO$_x$ (layer 15) | 10–300 Å | 40–150 Å | 141 Å |
| NiCrO$_x$ (layer 17) | 10–100 Å | 25–50 Å | 58 Å |
| Ag (layer 19) | 80–250 Å | 120–240 Å | 220 Å |
| NiCrO$_x$ (layer 21) | 10–100 Å | 30–55 Å | 42 Å |
| SnO$_2$ (layer 23) | 0–750 Å | 100–300 Å | 138 Å |
| Si$_3$N$_4$ (layer 25) | 0–750 Å | 100–320 Å | 203 Å |

In the Example (see right-hand column above for thicknesses in the Example), the NiCrO$_x$ contact layers 11 and 21 located above the respective IR reflecting layers were substantially fully oxidized, whereas the NiCrO$_x$ contact layer 17 under the top IR reflecting layer 19 was a sub-oxide and thus oxidized to a lesser extent than the other NiCrO$_x$ contact layers. As explained herein, this has unexpectedly permitted certain optical advantages to be achieved.

In certain example embodiments of this invention, coated articles herein may have the following optical and solar characteristics when provided in the context of an IG unit. The optics may be measured in accordance with Ill. C, 2 degree observer as is known in the art. In certain embodiments, at least the coated glass substrate is not thermally tempered. An example IG Unit, for purposes of reference only, includes a pair of 6 mm glass substrates (clear and/or green colored) separated by a space of 16 mm, not thermally tempered. The below data was taken at the normal viewing angle, unless otherwise specified (e.g., the $\Delta R_g Y$ data, $\Delta a^*_g$ data (absolute value), and $\Delta b^*_g$ data (absolute value) are indicative in the change in the listed value between the 0 degree viewing angle and a 45 degree viewing angle):

Example Optical Characteristics (IG Unit)

| Characteristic | General | More Preferred | Best |
|---|---|---|---|
| Selectivity (T$_{vis}$/SF): | ≥1.70 | ≥1.75 | ≥1.80 |
| SF (DIN 67507): | ≤27.0 | ≤25.0 | ≤23.0 (or ≤22.0) |
| SHGC: | ≤25.0 | ≤24.0 | ≤22.5 |
| T$_{vis}$ (or TY)(Ill C, 2 deg.): | 30–50% | 35–45% | 38–42% |
| a*$_t$: | −8 to +2 | −7 to +1 | −6 to 0 |
| b*$_t$: | −8 to +8 | −7 to +4 | −6 to +3 |
| R$_g$Y (outside refl.): | ≤15% | ≤13% | ≤12% |
| a*$_g$: | −5 to +2 | −3 to +2 | −2.5 to +1 |
| b*$_g$: | −17 to +10 | −14.0 to +4 | −12 to 0 |
| R$_g$Y (45° VA): | ≤17% | ≤16% | ≤15% |
| a*$_g$: | −5 to +3 | −3 to +2 | −2.5 to +2 |
| b*$_g$: | −17 to +10 | −14 to +4 | −13 to 0 |
| $\Delta R_g Y$ (shift from 0–45°): | ≤2.0% | ≤1.5% | ≤1.0% |
| $\Delta a^*_g$: | ≤3.5 | ≤2.5 | ≤2.1 |
| $\Delta b^*_g$: | ≤3.5 | ≤2.0 | ≤1.5 |
| R$_s$ (ohms/square): | ≤3.0 | ≤2.0 | ≤1.9 |

In certain example embodiments of this invention, coated articles herein may have the following optical and solar characteristics when measured monolithically (e.g., clear glass substrate 6 mm thick, not thermally tempered).

Example Optical Characteristics (Monolithic)

| Characteristic | General | More Preferred | Best |
|---|---|---|---|
| T$_{vis}$ (or TY)(Ill. C, 2 deg.): | 35–55% | 30–50% | 32–49% |
| a*$_t$: | −8 to +2 | −6 to +1 | −5 to 0 |
| b*$_t$: | −8 to +8 | −7 to +4 | −6 to +2 |
| R$_g$Y (glass side refl.): | ≤14% | ≤12% | ≤11% |
| a*$_g$: | −5 to +2 | −4 to +2 | −3 to +1 |
| b*$_g$: | −20 to +10 | −15 to +3 | −14 to 0 |
| $\Delta R_g Y$ (shift from 0–45°): | ≤2.0% | ≤1.5% | ≤1.0% |
| $\Delta a^*_g$: | ≤3.5 | ≤2.5 | ≤2.1 |
| $\Delta b^*_g$: | ≤3.5 | ≤2.0 | ≤1.5 |
| R$_f$Y (film side refl.): | ≤28% | ≤27% | ≤26% |
| a*$_f$: | −5 to +6 | −4 to +3 | −3 to +2 |
| b*$_f$: | −20 to +30 | −15 to +28 | −10 to +25 |
| R$_s$ (ohms/square): | ≤3.0 | ≤2.0 | ≤1.9 |

The following examples is provided for purposes of example only, and is not intended to be limiting unless specifically claimed.

EXAMPLE

The following Example 1 was made via sputtering the coating shown in FIG. 1 on a 6 mm thick clear glass substrates 1 so as to have approximately the layer stack set forth below and shown in FIG. 1. The physical layer thicknesses are approximations, and are in units of angstroms (Å).

Layer Stack for Example 1

| Layer | Thickness (Å) |
|---|---|
| Glass Substrate | |
| TiO$_2$ | 105 |
| ZnAlO$_x$ | 65 |
| Ag | 96 |
| NiCrO$_x$ (sco) | 38 |
| SnO$_2$ | 641 |
| ZnAlO$_x$ | 141 |
| NiCrO$_x$ (sub-oxide) | 58 |
| Ag | 220 |
| NiCrO$_x$ (sco) | 42 |
| SnO$_2$ | 138 |
| Si$_3$N$_4$ | 203 |

In the Example above, the NiCrO$_x$ contact layer 17 under the top IR reflecting layer 19 was a sub-oxide, whereas the other two NiCrO$_x$ contact layers were substantially fully oxidized ("sco" stands for substantially completely oxidized). The Example coated article was not thermally tempered or heat bent. The NiCrO$_x$ contact layer 17 under the top IR reflecting layer 19 was sputter-deposited as a sub-oxide by using a power of about 12–13 kW and a total oxygen gas flow (including main and tuning gases) in the sputtering chamber (with a NiCr sputtering target) of about 93 sccm, whereas the other two NiCrO$_x$ contact layers 11 and 21 were sputter-deposited in substantially fully oxidized form by using a power of from about 6–7 kW and a total oxygen gas flow (including main and tuning gases) in the sputtering chamber (with a NiCr sputtering target) of from about 119–135 sccm. Thus, the sub-oxide contact layer 17 was oxided to a lesser extent than were contact layers 11 and 21 and was thus more absorbing.

The coated article of Example 1, in monolithic form, had the following characteristics (Ill. C, 2 deg. for visible transmission and reflectance at normal viewing angles).

Example 1 (Monolithic)

| Characteristic | Example 1 |
| --- | --- |
| Visible Trans. ($T_{vis}$ or TY): | 43.69% |
| a* | −4.52 |
| b* | −5.19 |
| Glass Side Reflectance (RY): | 10.16% |
| a* | −0.74 |
| b* | −10.96 |
| Film Side Reflective (FY): | 25.46% |
| a* | −1.56 |
| b* | 24.91 |
| $R_s$ (ohms/square): | 1.80 |

The coated article of Example 1 was then coupled to another glass substrate about 6 mm thick to form an IG window unit as shown in FIG. 2, without being tempered. The gap between the two glass substrates was about 16 mm. The IG unit had the following characteristics, with a Colour Rendering Index of 90.

Example 1 (IG Unit)

| Characteristic | Example 1 |
| --- | --- |
| Selectivity ($T_{vis}$/SF): | 1.776 |
| SF: | 22.8 |
| Visible Trans. ($T_{vis}$ or TY): | 40.5% |
| a* | −5.32 |
| b* | −4.10 |
| Glass Side/Outside Reflectance (RY): | 11.5% |
| a* | −1.09 |
| b* | −11.59 |
| $R_s$ (ohms/square): | 1.8 |

Moreover, it was surprisingly found that the reflective/outside color is substantially independent of the polarization state of the incident light. In other words, the reflective/outside color does not significantly change as a function of the polarization state of the incident light. This represents a significant improvement in the art.

It can be seen from the Example set forth above that a combination of high selectivity and low SF was achieved, representing a significant example advantage in the art.

For purposes of comparison, in parent case Ser. No. 10/931,212, a Comparative Example (CE) coated article was made similar to Example 1 in that parent case except that in the comparative example the contact layer 17 was not present. The result in an IG unit was a higher selectivity. Thus, it will be appreciated that the use of a contact layer 17 in sub-oxide form surprisingly and unexpectedly results in a coated article having an improved SF value as well as improved selectivity.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An insulating glass (IG) window unit comprising:
    first and second glass substrates, and a coating supported by one of the substrates, the coating comprising:
    at least a first layer comprising silver sandwiched between and contacting first and second contact layers, wherein the first contact layer is located below said layer comprising silver and is oxided to a lesser extent than is the second contact layer located above said layer comprising silver, so that moving away from the one glass substrate that supports the coating the coating comprises the first contact layer, the first layer comprising silver, and then the second contact layer;
    wherein said first contact layer comprises an oxide of Ni and/or Cr and is located between and contacting said layer comprising silver which is above said first contact layer and a layer comprising zinc oxide which is below said first contact layer, so that the layer comprising zinc oxide is located between at least the first contact layer and the one glass substrate that supports the coating; and
    wherein the IG window unit has a visible transmission of from 30 to 50%, a selectivity ($T_{vis}$/SF) of at least 1.70, and a solar factor (SF) of no greater than 25.0.

2. The IG window unit of claim 1, wherein the coating further comprises a second layer comprising silver and a third contact layer that is located below and contacting said second layer comprising silver, and wherein said third contact layer which is under said second layer comprising silver is of a different material than is said first contact layer which is under said first layer comprising silver.

3. The IG window unit of claim 1, wherein each of the first and second contact layers comprise an oxide of Ni and/or Cr.

4. The IG window unit of claim 1, wherein the coating includes only two infrared (IR) reflecting layers comprising silver.

5. The IG window unit of claim 1, wherein the IG window unit has a selectivity of at least 1.75.

6. The IG window unit of claim 1, wherein the IG window unit has a SF of no greater than 24.0.

7. The IG window unit of claim 1, wherein the IG window unit has a SF of no greater than 23.0.

8. The IG window unit of claim 1, wherein the IG window unit has an outside reflective a* value, at a normal viewing angle, of from −3 to +2.

9. The IG window unit of claim 1, wherein the coating has a sheet resistance ($R_s$) of no greater than 3.0 ohms/square.

10. The IG window unit of claim 1, wherein the glass substrate supporting the coating is not heat treated with the coating thereon.

11. The IG window unit of claim 1, wherein the IG window unit has a visible transmission of from about 35 to 45%.

12. The IG window unit of claim 1, wherein the IG unit has an outside a* value which does not change by more than 3.5 given a viewing angle shift from 0 to 45 degrees.

13. The IG window unit of claim 1, wherein the IG unit has an outside a* value which does not change by more than 2.5 given a viewing angle shift from 0 to 45 degrees.

14. The IG window unit of claim 1, wherein outside reflective a* and b* of the IG window unit do not change by more than 3.5 given a viewing angle shift from 0 to 45 degrees.

15. The IG window unit of claim 1, wherein reflective/outside color of the IG window unit does not significantly change as a function of polarization state of incident light.

16. The IG window unit of claim 1, wherein the coating comprises at least the following layers from the substrate which supports the coating outwardly:
   a first dielectric layer;
   another layer comprising zinc oxide;
   a first layer comprising silver;
   a contact layer;
   a second dielectric layer;
   said layer comprising zinc oxide;
   said first contact layer;
   said first layer comprising silver;
   said second contact layer;
   a third dielectric layer; and
   an overcoat layer.

17. An insulating glass (IG) window unit comprising:
   first and second glass substrates, and a coating supported by one of the substrates, the coating comprising:
   first and second infrared (IR) reflecting layers, each of the IR reflecting layers being sandwiched between and contacting a pair of contact layers,
   wherein the contact layer located under and contacting the first IR reflecting layer comprises zinc oxide, and wherein the contact layer located under and contacting the second IR reflecting layer comprises an oxide of Ni and/or Cr and is oxidized to a lesser extent than is the contact layer located over and contacting said second IR reflecting layer, so that moving away from the one glass substrate that supports the coating the coating comprises the contact layer comprising zinc oxide, the first IR reflecting layer, the contact layer comprising an oxide of Ni and/or Cr, and then the second IR reflecting layer; and
   wherein the IG window unit has a selectivity ($T_{vis}$/SF) of at least 1.70, and a solar factor (SF) of no greater than 25.0.

18. The IG window unit of claim 17, wherein the coating includes only two infrared (IR) reflecting layers.

19. The IG window unit of claim 17, wherein the IG window unit has a SF of no greater than 23.0 and a selectivity of at least 1.75.

20. A coated article including a coating supported by a glass substrate, the coating comprising:
   at least one IR reflecting layer sandwiched between and contacting first and second contact layers, wherein the first contact layer is located below said IR reflecting layer and is oxidized to a lesser extent than is the second contact layer located above said IR reflecting layer, so that moving away from the glass substrate the coating comprises the first contact layer, the IR reflecting layer, and then the second contact layer;
   wherein said first contact layer comprises an oxide of Ni and/or Cr and is located between and contacting said IR reflecting layer which is above said first contact layer and a layer comprising zinc oxide which is below and contacting said first contact layer, so that the layer comprising zinc oxide is located between at least the first contact layer and the glass substrate; and
   wherein the coated article has a selectivity ($T_{vis}$/SF) of at least 1.70.

* * * * *